United States Patent [19]

Takagi et al.

[11] Patent Number: 4,482,234

[45] Date of Patent: Nov. 13, 1984

[54] AUTOMATIC FOCUSING DEVICE

[75] Inventors: Tadao Takagi, Yokohama; Nobuo Okabe, Tokyo, both of Japan

[73] Assignee: Nippon Kogaku K.K., Tokyo, Japan

[21] Appl. No.: 441,786

[22] Filed: Nov. 15, 1982

[30] Foreign Application Priority Data

Nov. 17, 1981 [JP] Japan .............................. 56/183001
Nov. 17, 1981 [JP] Japan .............................. 56/183002
Jul. 29, 1982 [JP] Japan .............................. 57/131106

[51] Int. Cl.³ .............................................. G03B 3/10
[52] U.S. Cl. ................................................ 354/402
[58] Field of Search ........................ 354/25, 195, 402; 352/140

[56] References Cited

U.S. PATENT DOCUMENTS 4,293,206 10/1981 Tokutomi et al. .................... 354/25
4,314,748 2/1982 Kawabata et al. .................... 354/25

Primary Examiner—Michael L. Gellner
Attorney, Agent, or Firm—Fitzpatrick, Cella, Harper & Scinto

[57] ABSTRACT

An automatic focusing device includes a detecting device for detecting a state of an object image formed by an objective lens, a driving device for driving the lens in response to the detecting device, and a setting device for setting a moving range in which the lens is movable by the driving device. The moving range may be selected from mutually different plural ranges including a first range and a second range which have a mutually overlapping portion, or including a range containing a part of a normal moving range and a part of a macrophotographing moving range. Further, the moving range may be selected by setting an end position thereof beyond which the lens is prevented from moving.

14 Claims, 12 Drawing Figures

AUTOMATIC FOCUSING DEVICE

BACKGROUND OF THE INVENTION

1. Field of the Invention

The present invention relates to an automatic focusing device for focusing an objective lens to an object by moving an optical system of the lens by a driving device in response to means for detecting the focusing state of the object, and more particularly to an automatic focusing device so constructed as to allow focusing to an object located within an arbitrarily selected distance range.

2. Description of the Prior Art

For the purpose of accelerating the focusing operation of an automatic focusing device particularly for a photographic camera, it is conceivable to divide the entire photographing distance range into a certain number of ranges, namely to divide the entire movable stroke of a photographing lens corresponding to said entire photographing distance range into a certain number of sections and to drive the photographing lens for focusing onto to an object in a selected distance range, thereby preventing unnecessary drive of the photographing lens which might be caused by a sudden entry of a different object into a distance-measuring area in the object field or by displacement of the distance-measuring area resulting from camera shake, or enabling focusing to a particular object among plural ones positioned at different distances along the photographing optical axis.

However, a structure involving simple division of the entire distance range into several ranges for example a far-distance range, a medium-distance range and a near-distance range, wherein a distance range containing a desired object is selected from thus divided ranges and the lens is moved only within the selected distance range is inconvenient in that such structure becomes unable to effect focusing particularly in case the object is positioned in the neighborhood of the boundary of two divided distance ranges and moves over the two ranges.

SUMMARY OF THE INVENTION

An object of the present invention is to provide an automatic focusing device capable of focusing only to an object positioned within a selected distance range wherein each distance range is so determined as to mutually overlap with the adjacent ones.

Another object of the present invention is to provide an automatic focusing device adapted for use with a photographing lens capable of so-called macro-photographing, wherein a selectable distance range contains at least a part of a distance range for such macro-photographing.

Still another object of the present invention is to provide an automatic focusing device capable of completely matching a driving stroke section of the photographing lens with a distance range desired by the operator.

DESCRIPTION OF THE PREFERRED EMBODIMENTS

Figure 1:
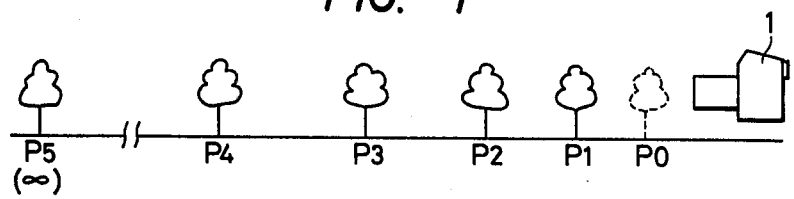
FIG. 1 is a schematic view showing a spatial arrangement in an object field.

In FIG. 1, a camera 1 provided with an automatic focusing device of the present invention is shown at a right-hand end, and an entire focusable region of the camera 1 from a nearest position P1 thereto to an infinity position P5 is suitably divided into four ranges by boundary positions P2, P3 and P4.

Figure 2:
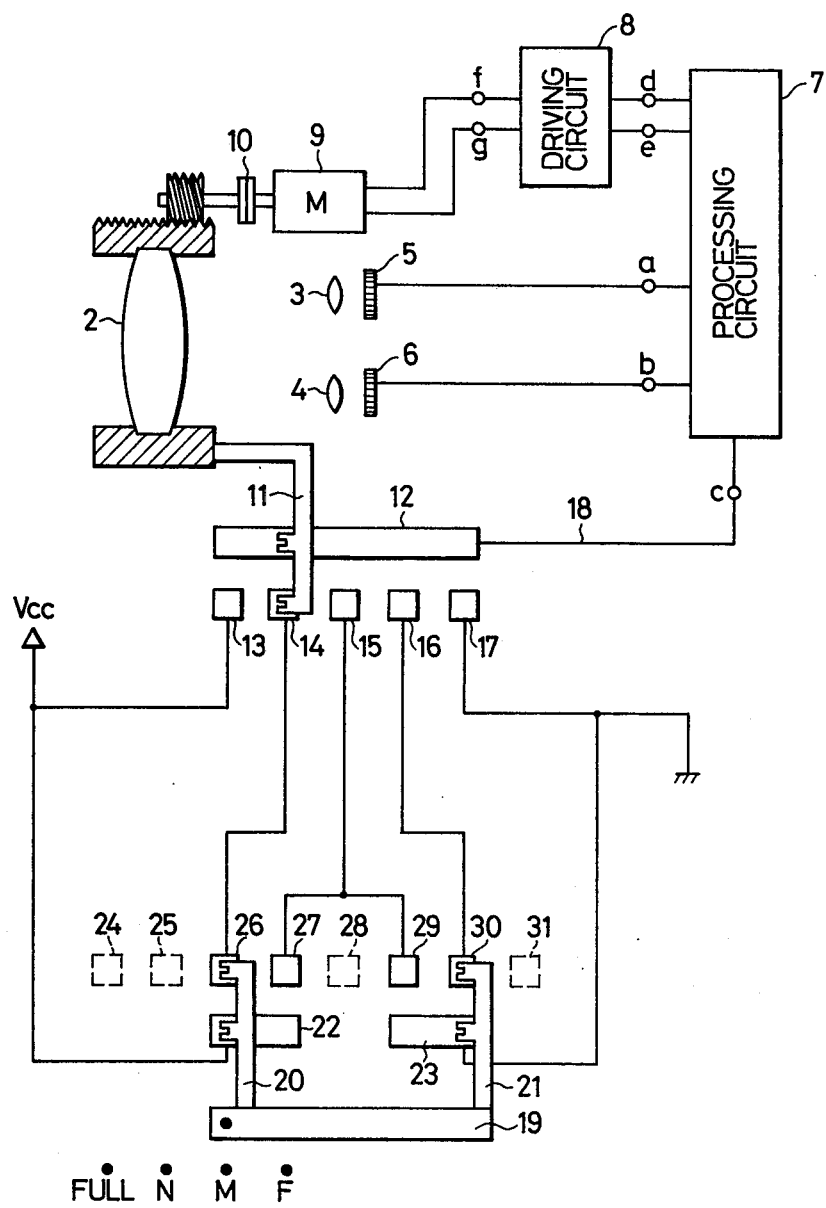
FIG. 2 is a schematic view of an automatic focusing device representing a first embodiment of the present invention.

FIG. 2 shows the basic principle of an embodiment of the present invention, wherein a pair of relay lenses 3, 4 are positioned symmetrical to the optical axis of an objective lens 2 for photographing, thereby guiding a part of the light beam transmitted by the objective lens 2 to a pair of photoelectric sensors 5, 6 through the relay lenses 3, 4 respectively.

The paired photoelectric sensors 5, 6 being positioned on a plane equivalent to a predetermined focal plane and thus functioning as photoelectric converters for detecting the image position, are composed of photoelectric converting arrays. A processing circuit 7 discriminates a front-focused, rear-focused or in-focus state by comparing output signals received from the above-mentioned paired photoelectric arrays through terminals a, b and accordingly drives a motor 9 connected through terminals f, g to a motor driving circuit 8 which is in turn connected through terminals d, e to the processing circuit, thereby rotating gear head through a clutch 10 to displace the objective lens 2 to an in-focus position.

A conductive member 11, linked with the objective lens 2, touches a contact 13, 14, 15, 16 or 17 when the objective lens 2 is focused to the position P1, P2, P3, P4 or P5, respectively, whereby a contact 12 assumes a potential of the above-mentioned contact touching the conductive member 11.

The contact 13 constantly has a potential Vcc while the contact 17 constantly has a ground potential, and each of other contacts 14, 15, 16 assumes the abovementioned potential Vcc, ground potential or an open state according to the position of an operating member 19 for selecting the distance range for photographing operation. The state of the contacts 13–17 is transmitted, through the conductive member 11, the contact 12, a line 18 and an input terminal c to the processing circuit 7, which generates a signal to the driving circuit 8 to rotate the motor 9 thereby moving the objective lens 2 from the nearest side to the infinite side, namely toward the right in FIG. 2, in response to an output signal of the level Vcc from the line 18, or a signal to move the objective lens 2 from the infinite side to the nearest side, namely toward the left in FIG. 2, in response to an output signal of the ground level from the line 18. The processing circuit 7 and the motor driving circuit 8 will be further explained later in relation to FIGS. 3 and 4.

A selector switch part, for selecting the distance range for photographing operation, is capable of selecting four modes F, M, N and FULL by the operating member 19. The operating member 19 of an insulating material is provided with conductive members 20, 21 at a determined distance, while the selector switch part is provided with a contact 22 maintained at the potential Vcc, a contact 23 maintained at the ground potential and other contacts 24–31, of which broken-lined contacts 24, 25, 28 and 31 may be dispensed with.

FIG. 2 shows a state in which the operating member 19 is positioned to select the mode M, wherein the conductive members 20, 21 of the operating member 19 respectively touch the contacts 26, 30, thereby maintaining the contact 14 at the potential Vcc and maintaining the contact 16 at the ground potential. Consequently, in this state the conductive member 11 moves between the contacts 14 and 16, so that the objective lens 2 moves between positions corresponding to the boundary points P2 and P4. Even if the objective lens 2 is initially located outside the range between the two positions, it moves between the positions once it passes the position corresponding to the boundary point P2 or P4. Such function will be further explained later.

Similarly, when the operating member 19 is positioned to select the mode F, the contacts 13, 15 are maintained at the potential Vcc while the contact 17 is maintained at the ground potential so that the conductive member 11 moves between the contacts 15 and 17. Also when the operating member 19 is positioned to select the mode N, the contact 13 is maintained at the potential Vcc while the contact 15 is maintained at the ground potential, whereby the conductive member 11 moves between the contacts 13 and 15. Furthermore, when the operating member 19 is positioned at FULL, the contact 13 is maintained at the potential Vcc while the contact 17 is maintained at the ground potential, and other contacts 14–16 are in the open state so that the conductive member 11 moves between the contacts 13 and 17.

These relationships are summarized in Tab. 1.

TABLE 1

| Switch position | Object position |
|---|---|
| F | P3 ↔ P4 |
| M | P2 ↔ P4 |
| N | P1 ↔ P3 |
| FULL | P1 ↔ P5(∞) |

As shown in Tab. 1, the distance ranges for photographing selected objects by positioning the operating member 19 at F, M, N and FULL mutually overlap one another. Thus, even when the object moves around the boundary point P3 of the distance range in the mode F, the operator can achieve rapid photographing with satisfactory focusing by positioning the operating member 19 at the mode M. In this manner it is rendered possible, not only when the object is apart from the boundary point of a distance range but also is close to such boundary point, to select an appropriate distance range securely containing the object.

Figure 4:
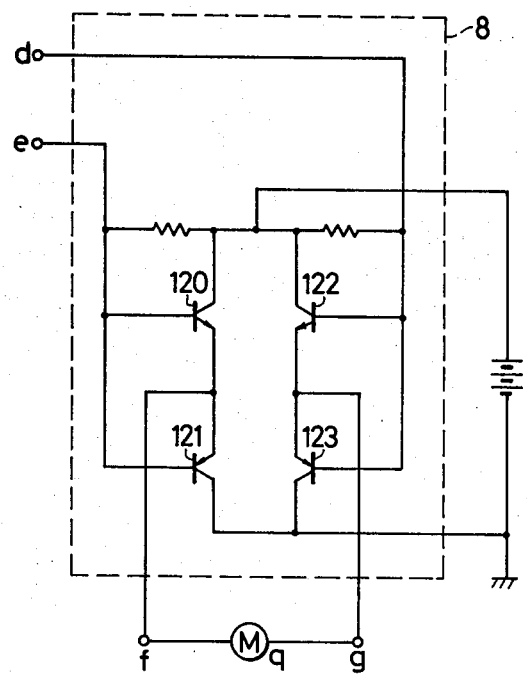
FIG. 4 is a circuit diagram showing an example of a motor driving circuit.

In the above-described embodiment, the relay lenses 3, 4, photoelectric sensors 5, 6, processing circuit 7 and a power source shown in FIG. 4 are provided in a camera body or a view finder provided thereon. It is to be noted that the term "Camera" used in the present invention indicates the camera body itself or the combination of the camera body and an interchangeable view finder detachably mounted thereon, if such view finder is employed. In the foregoing embodiment, the elements 3 to 7 and the power source are provided in the camera, while other elements are all provided in the interchangeable lens barrel detachably mounted on the camera, wherein the electric connections between the lens barrel and the camera are achieved through the contacts c, d and e.

Figure 3:
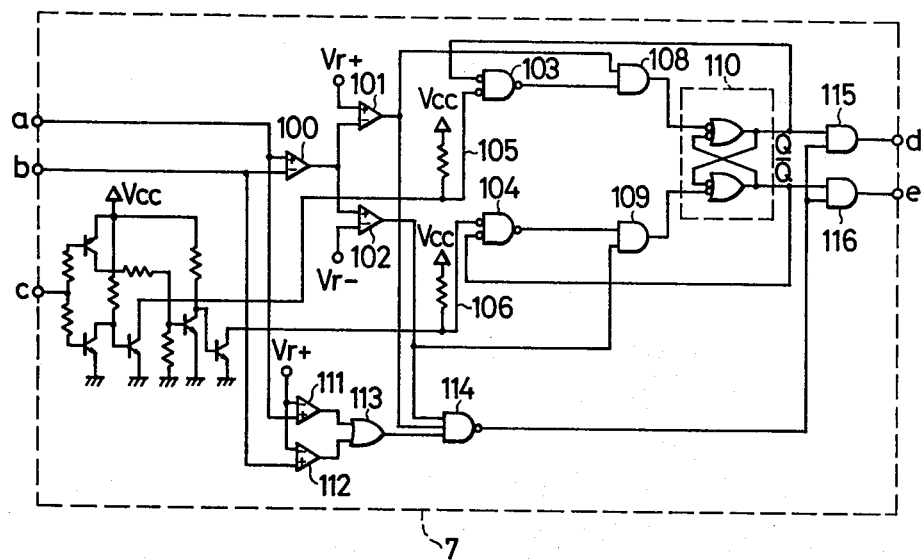
FIG. 3 is a circuit diagram showing an example of a processing circuit.

FIG. 3 shows an example of the processing circuit 7 explained in FIG. 2, wherein the terminals a, b, c, d and e are common in both drawings. The output signals from the photoelectric sensors 5, 6 are supplied, through the input terminals a, b and further through a differential amplifier 100, to comparators 101, 102 for comparison with threshold voltages Vr+ and Vr−. The signals are also supplied respectively to comparators 111, 112 for comparison with the threshold voltage Vr+, and the output signals of the comparators 111, 112 are supplied to an OR gate 113. The output signals from the comparators 101, 102 and the gate 113 are supplied to a NAND gate 114, which therefore produces an L-level output signal in the in-focus state and an H-level output signal in other states. Thus, gates 115, 116 produce L-level output signals in response to the L-level signal from the gate 114 regardless of an output signal from a flip-flop 110, and transmit the output signals of the flip-flop 110 in response to the H-level signal from the gate 114. The output signals from the comparators 101, 102 are also supplied to gates 108, 109 for generating, through the flip-flop 110, a signal for representing the rotating direction of the motor 9.

The input terminal c is maintained at the potential Vcc, open state or ground potential according to the position of the objective lens 2. Gates 103, 104 receive the output signals Q and Q̄ of the flip-flop 110 and an output signal of transistors changing in response to a signal received at the terminal c, and invert the output signals of the flip-flop 110. When the terminal c is maintained open, the gates 103, 104 receive the potential Vcc through lines 105, 106. When the terminal c receives the potential Vcc, the gate 104, receiving the ground potential through the line 106, inverts the output signal of the flip-flop 110 through a gate 109 only when the output signal Q̄ of the flip-flop 110 is at the L-level, namely while the motor 9 moves the objective lens 2 from the infinite side to the nearest side. Even in the presence of the potential Vcc at the terminal c, the flip-flop 110 is not inverted if the motor 9 is rotated in the opposite direction. Similarly, in response to the ground potential supplied to the terminal c, the gate 103 receives the ground potential through the line 105 and inverts the output signal of the flip-flop 110 only when the motor 9 moves the objective lens 2 from the nearest side to the infinite side. In this manner, AND gates 115, 116 receive the output signals of the flip-flop 110 and of the gate 114 and transmit output signals to the terminals d, e. In an unfocused state, the terminals d and e respectively assume the H-level and L-level or vice versa according to the direction in which the objective lens 2 is to be driven, but both assume the L-level in the in-focus state.

FIG. 4 shows an example of the motor driving circuit 8 shown in FIG. 2, wherein input terminals d, e are common to those shown in FIGS. 2 and 3, and output terminals f, g are common to those shown in FIG. 2.

When the terminals d, e are both at the L-level, transistors 120, 122 are turned off while transistors 121, 123 are turned on to shortcircuit the terminals f, g, thereby stopping the motor 9 connected therebetween. When the terminal d is at the H-level while the terminal e is at the L-level, the transistors 121, 122 are turned on while the transistors 120, 123 are turned off to generate a current from the terminal g to the terminal f through motor 9, thus rotating the motor 9 in a direction to move the lens 2 toward left in FIG. 2. An inverse operation is effected when the terminals d and e are respectively at the L- and H-level.

Now there will be given an explanation on the function of the device of the present invention shown in FIGS. 2 to 4.

As an example, there is assumed an initial state in which the objective lens 2 is located between a lens position corresponding to P1 and another position corresponding to P2, while the target object is positioned between P2 and P4, and the operating member 19 is positioned to select the mode M as shown in FIG. 2.

The rotation of the motor 9 is determined by the initial state of the flip-flop 110. As an example, in case the output signals Q, Q̄ of the flip-flop 110 are respectively in the L-level and H-level in an unfocused state, the terminals d, e respectively generate L-level and H-level signals thereby rotating the motor 9 in a direction to move the objective lens 2 toward right in FIG. 2. Then, after the lens 2 passes the position corresponding to P2, so that the conductive member 11 passes the contact 14, the in-focus state is reached when the output signals from the terminals a and b become mutually equal at a certain level, whereupon the processing circuit 7 supplies L-level signals from the terminals d and e to stop the motor 9.

Then, in case the output signals Q, Q̄ of the flip-flop 110 are respectively in the H- and L-level in the aforementioned initial state, the terminals d and e respectively supply the H- and L-level signals, thereby inversely rotating the motor 9 to move the lens toward the left in FIG. 2. Then, when the lens 2 reaches a position corresponding to P1, so that the conductive member 11 touches the contact 13, the terminals d and e respectively supply the L- and H-level signals to move the lens 2 toward right in FIG. 2. In this manner, the in-focus state is reached after the lens 2 passes the position corresponding to P2, whereby the output terminals d and e of the processing circuit 7 both supply L-level signals to stop the motor 9.

As explained in the foregoing, the lens 2 is brought into a moving range corresponding to the selected distance range and reaches the in-focus state therein, regardless of the initial state of the lens 2.

Figure 5:
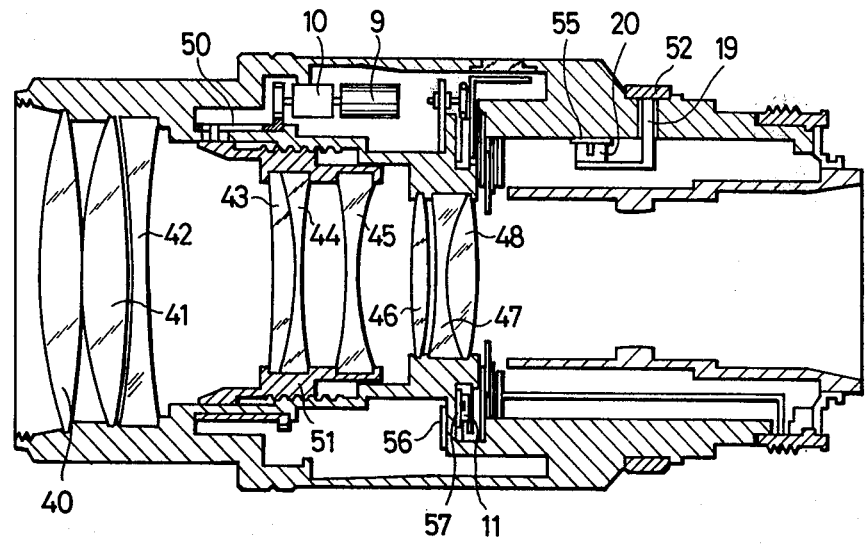
FIG. 5 is a cross-sectional view of a lens barrel incorporating a part of the device of the present invention.

FIG. 5 shows an actual example of the embodiment shown in FIG. 2, wherein all the elements of the device are incorporated in a lens barrel except the paired relay lenses 3, 4, photoelectric sensors 5, 6 and processing circuit 7. In FIG. 5, the elements of the same functions as those in FIG. 2 are represented by same reference numerals. The objective lens 2 for photographing is composed of lens groups 40–49. The motor 9 drives a lens support tube 51 through the clutch 10 and a final gear 51 rotating around the optical axis. Lenses 43–45 are moved by the support tube 51 for focusing. A board 57 having the contacts 12–17 is fixed along the periphery of a fixed tube, and the conductive member 11 moving with the rotation of the support tube 51 is maintained in contact with the board 57. A board 55 having the contacts 22–31 is fixed along the periphery of the fixed tube, and the conductive members 20, 21 provided on the operating member 19 to be moved by an operating ring 52 for selecting the distance range are maintained in contact with the board 55. Also a board 56 bearing the driving circuit 8 is positioned on the opposite side of the fixed tube to the side of the above-mentioned board 57.

Figure 6:
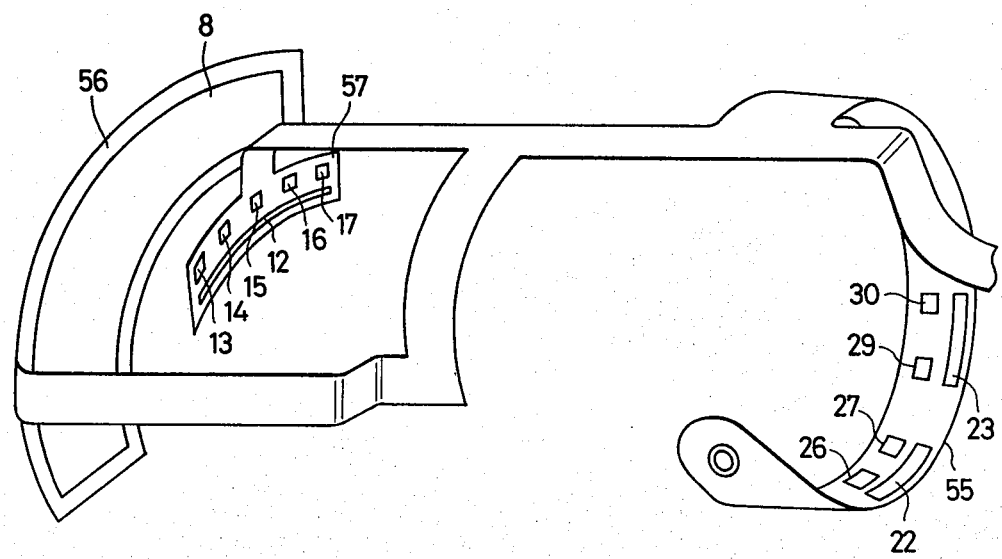
FIG. 6 is a perspective view of a flexible printed circuit board incorporated in the lens barrel shown in FIG. 5.

The above-mentioned boards are formed and assembled as an integral flexible printed circuit board as shown in FIG. 6.

Figure 7:
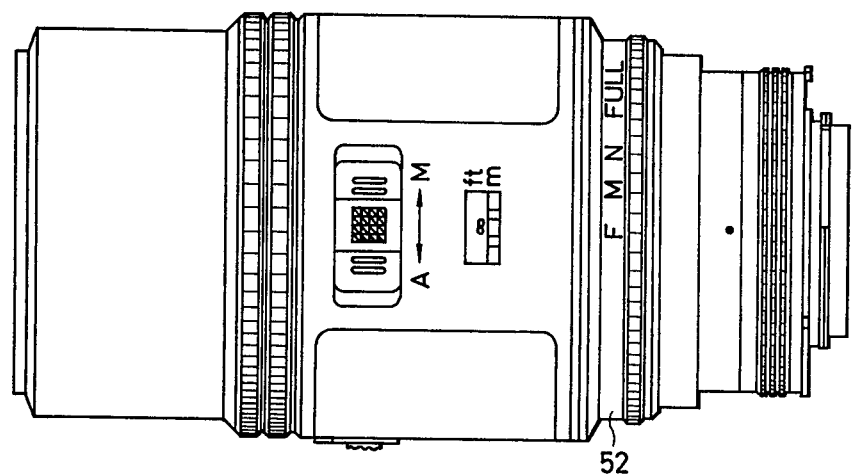
FIG. 7 is an external view of the lens tube shown in FIG. 5.

FIG. 7 shows the external view of the lens barrel shown in FIG. 5.

It is possible to expand the focusable distance range from the nearest position P1 to a broken-lined nearest position P0 (FIG. 1) by the use of a lens barrel capable of changing the nearest position to expand the focusable distance range, namely a lens barrel having a macro-photographing distance range. An embodiment shown in FIG. 8 is adapted for use in combination with such lens barrel, particularly a zoom lens barrel of a type in which a macro-photographing distance range is automatically added on setting a zooming ring at a particular position whereby the nearest focusable distance is shorter than that in the normal state and the entire focusable distance range covers from thus shortened nearest distance to the infinity distance.

Figure 8:
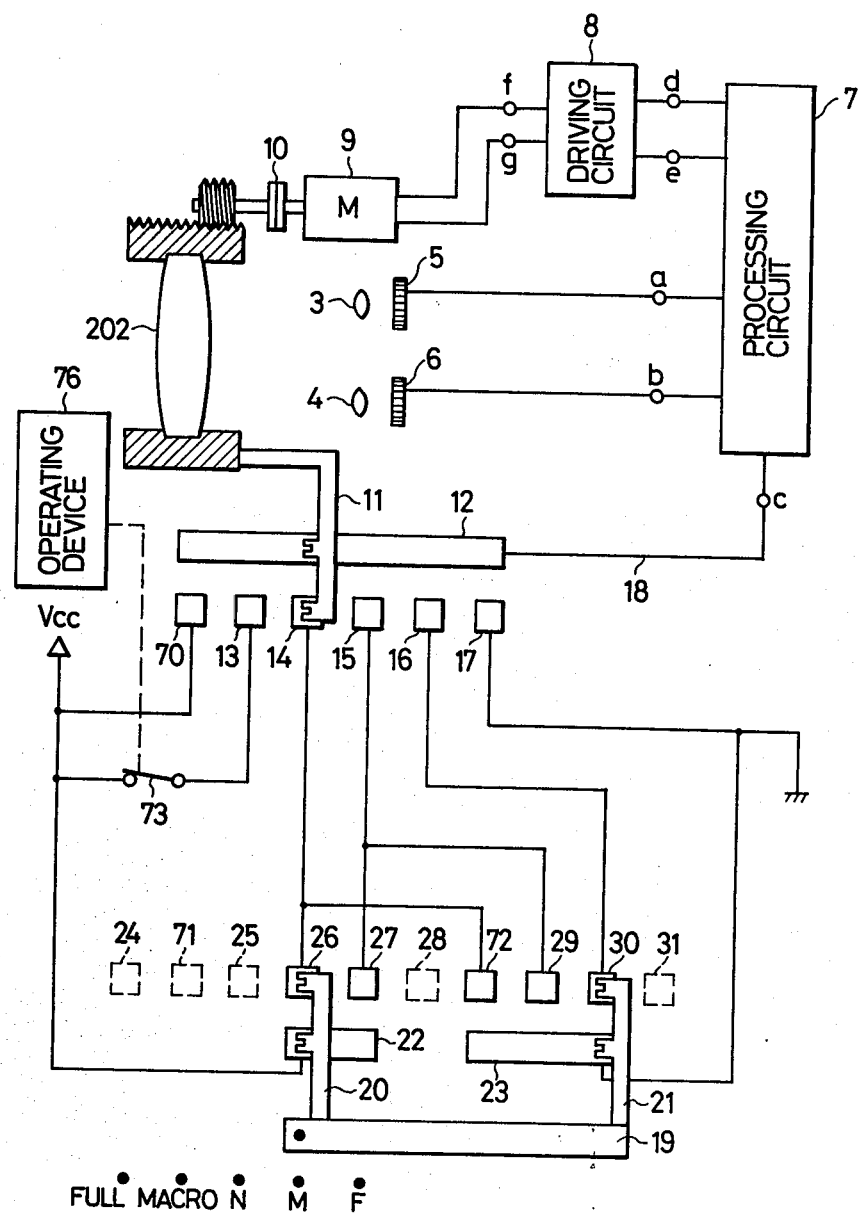
FIG. 8 a schematic view of an automatic focusing device representing a second embodiment of the present invention.

In the embodiment shown in FIG. 8 there is provided a contact 70 connected to the potential Vcc and adapted to touch the conductive member 11 when an objective lens 202 in such lens barrel is at a position focused to an object at the nearest position P0 in the above-mentioned macro-photographing distance range. Also the operating member 19 of the selecting switch part can select the MACRO mode in addition to the aforementioned four modes of F, M, N and FULL, and the selecting switch part is provided additionally with contacts 71, 72 adapted to touch the conductive members 20, 21 when the MACRO mode is selected. The contact 71, being an open contact, may be dispensed with, while the contact 72 is connected to the contact 26.

A switch 73 is turned off when the objective lens 202 is actuated by an operating device 76 to expand the focusable distance region of the lens to include the macro-photographic distance range.

In case the objective lens 202 is a zoom lens, the operating device 76 can be composed of a device for setting the zooming ring at a particular position.

When the operating member 19 is positioned at the MACRO mode, the contact 70 is maintained at the potential Vcc while the contact 13 is maintained open, and the contact 70 is maintained at the ground potential, whereby the conductive member 11 move between the contacts 70 and 14. The functions of the present embodiment can be summarized as shown in Tab. 2.

TABLE 2

| Switch position | Object position |
| --- | --- |
| | P0　P1　P2　P3　P4　P5(∞) |
| F | ←———————————→ |
| M | ←—————————→ |
| N | ←———————→ |
| MACRO | ←———→ |
| | <　> |
| FULL | ←————————→ |
| | ←————————→ |

When the operating member 19 is positioned at MACRO, it is also possible to limit the stroke of the lens to a broken-lined section between P0 and P1 shown in Tab. 2 by connecting the contact 13 to the ground potential by unrepresented switch means. The objective lens is driven between the positions corresponding to P0 and P5 when the operating device 76 is actuated and the operating member 19 is positioned at FULL.

Then, when the switch 73 is turned off, the focusing range is defined between the nearest position P0 which is closer than the ordinary nearest position P1 and the position P2 or P5. Consequently the operator can select the position MACRO if the object is securely contained in the macro-photographing distance range, or the position FULL if he cannot be sure whether the object is present in said distance range.

Figure 9:
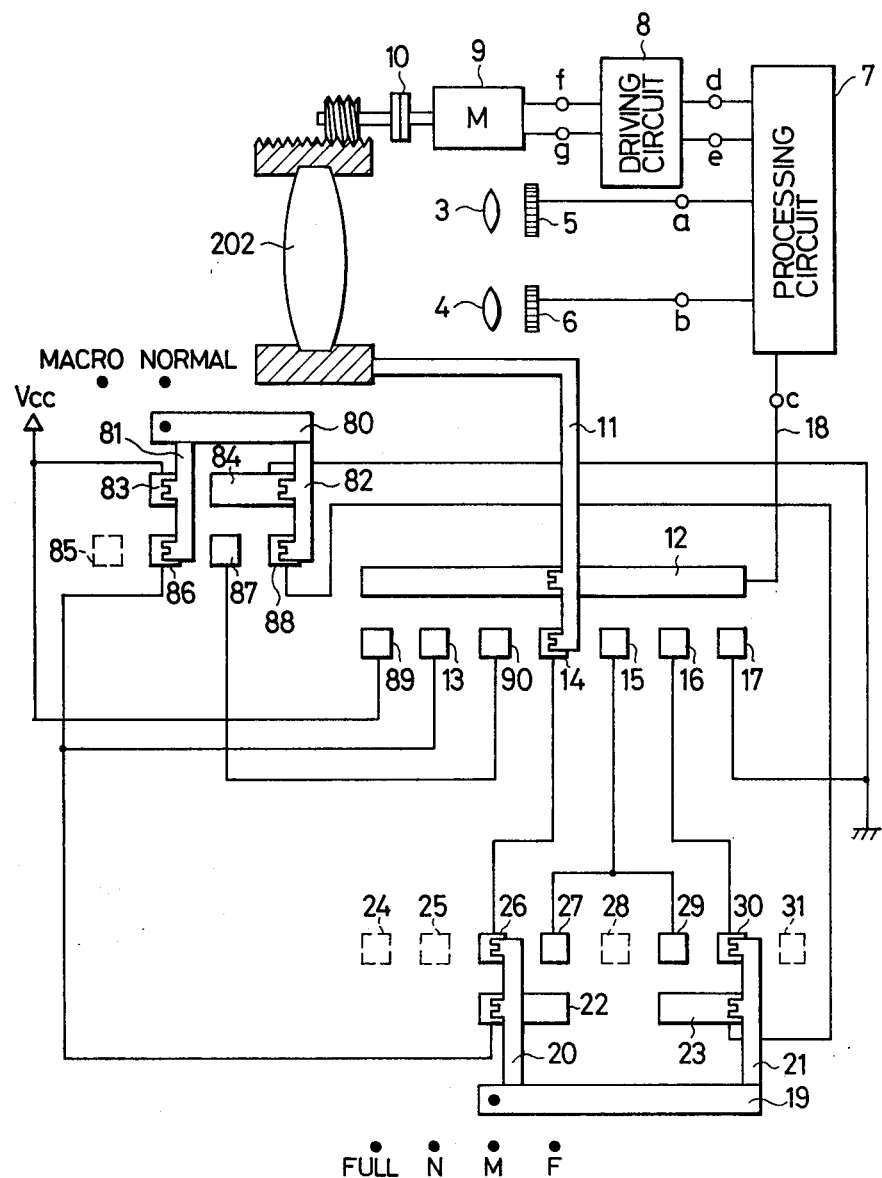
FIG. 9 is a schematic view of an automatic focusing device representing a third embodiment of the present invention.

FIG. 9 shows another embodiment particularly suitable for a lens barrel of a type which can be shifted to the macro-photographing state by an operation different from the manual focusing or zooming operation. In this embodiment there is provided a member 80 used in relation to the selection of the focusable distance range either within the ordinary region from P1 to P5 or within the macro-photographing distance range from P0 to P1. The member 80 is provided with conductive members 81, 82 positioned with a determined distance therebetween. In the illustrated state, the member 80 is positioned at NORMAL to select the normal distance region, whereby the contacts 13, 22 receive the potential Vcc through the contact 86, conductive member 81 and contact 83. Similarly the contact 23 is maintained at the ground potential through the contact 88, conductive member 82 and contact 84. Also the contact 90 is maintained open. On the other hand, the operating member 19 is positioned at M, whereby the contact 14 is maintained at the potential Vcc through the contact 26, conductive member 20 and contact 22, while the contact 16 is maintained at the ground potential through the contact 30, conductive member 21 and contact 23. Consequently, in a state shown in FIG. 9, the conductive member 11 moves between the contacts 14 and 16. Similarly, in response to the positioning of the operating member 19 at F, N or FULL, the conductive member 11 moves respectively between the contacts 15 and 17, between the contacts 13 and 15, or between the contacts 13 and 17. However, when the member 80 is positioned at MACRO to select the macro-photographing distance range, the contact 90 is connected to the ground potential while the contacts 13, 14, 15, 16 are left open, so that the conductive member 11 moves between the contacts 89 and 90 corresponding to the macro-photographing distance range, irrespective of the position of the operating member 19. A broken-lined contact 85 may be dispensed with. The functions of this embodiment are summarized in Tab. 3.

TABLE 3

| Macro-range switch | Selector switch | Object position |
| --- | --- | --- |
| | | P0　P1　PM　P2　P3　P4　P5(∞) |
| NORMAL | F | ←———————————→ |
| | M | ←—————————→ |
| | N | ←———————→ |
| | FULL | ←————————→ |
| MACRO | any position | ←———→ |

In this embodiment the macro-photographing distance range is limited, at the farther side, by a point PM positioned between P1 and P2, but the position of this point can be arbitrarily determined according to the design of the automatic focusing device.

Figure 10:
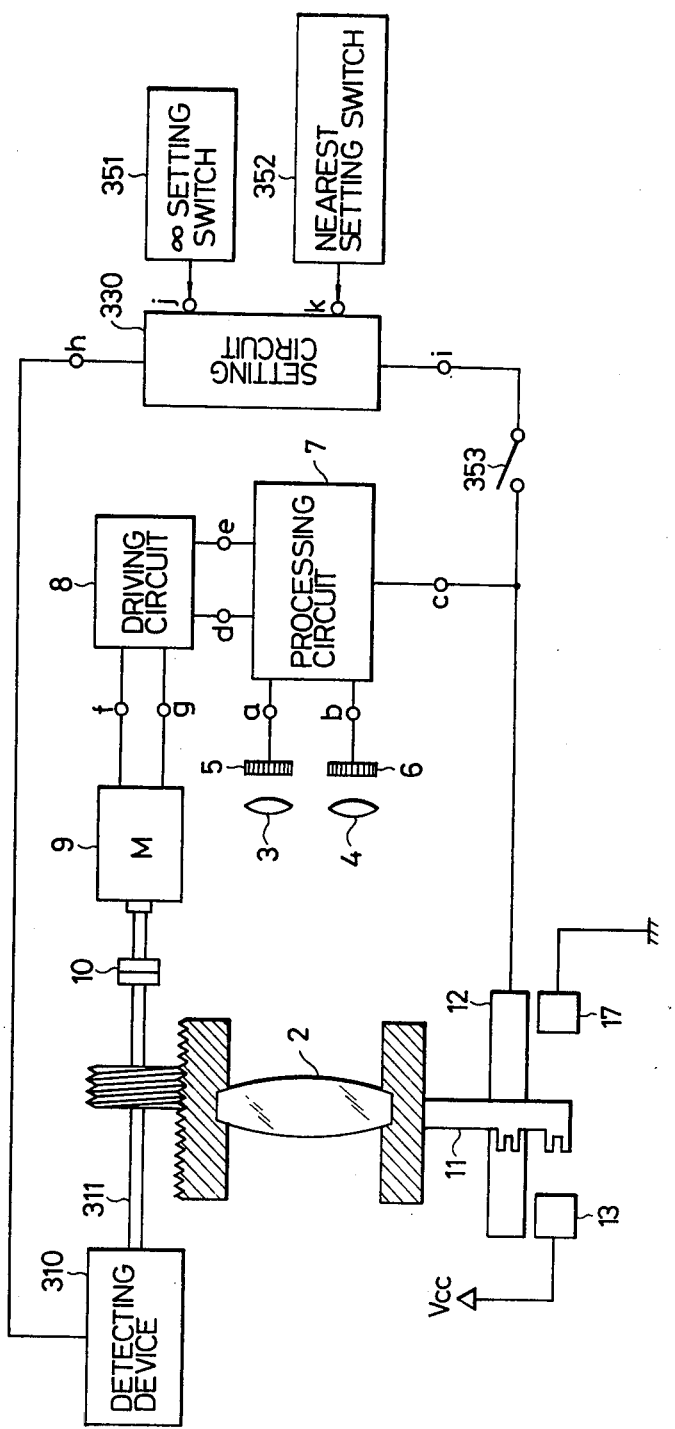
FIG. 10 is a schematic view of an automatic focusing device representing a fourth embodiment of the present invention.

FIG. 10 shows another embodiment in which the operator can continuously change the driving stroke of the objective lens.

In this embodiment the conductive member 11 linked with the objective lens 2 connects the contacts 13 and 12 when the lens is in a position focused to an object at the nearest distance, and connects the contacts 17 and 12 when it is in a position focused to an object at the infinite distance. The output signal of the potential Vcc or the ground potential from the contact 12 is supplied to the aforementioned processing circuit 7.

A detecting device 310 detects the displacement of the lens 2 through the rotation of a shaft 311 and converts this displacement into an electric signal, as will be further explained later. Consequently, regardless whether the lens 2 is driven by the rotation of the motor 9 or it is driven by an unrepresented manual operating member while the clutch 10 is disconnected by an unrepresented mechanism, the detecting device 310 supplies a signal representing the displacement of the lens to a setting circuit 330.

The setting circuit 330 defines the end positions of a desired moving range of the objective lens 2, thereby controlling the processing circuit 7 in such a manner as to enable the movement of the lens with thus defined range. The setting of the moving range can be carried out by moving the lens manually or by the motor so as to focus to an end position of the desired photographing distance range, for example to the infinite distance, then closing an infinity setting switch 351, then moving the lens to the other end position of the desired distance range, for example to the nearest position, and closing another setting switch 352. The desired moving range of the lens is set in this manner, and the lens is thereafter driven within this range. The above-explained setting procedure may also be conducted in the inverted order.

The moving range of the lens is controlled by the output signal from an output terminal i of the setting circuit 330 when a switch 353 is closed, and the range is limited between the contacts 13 and 17 when said switch is open.

Figure 11:
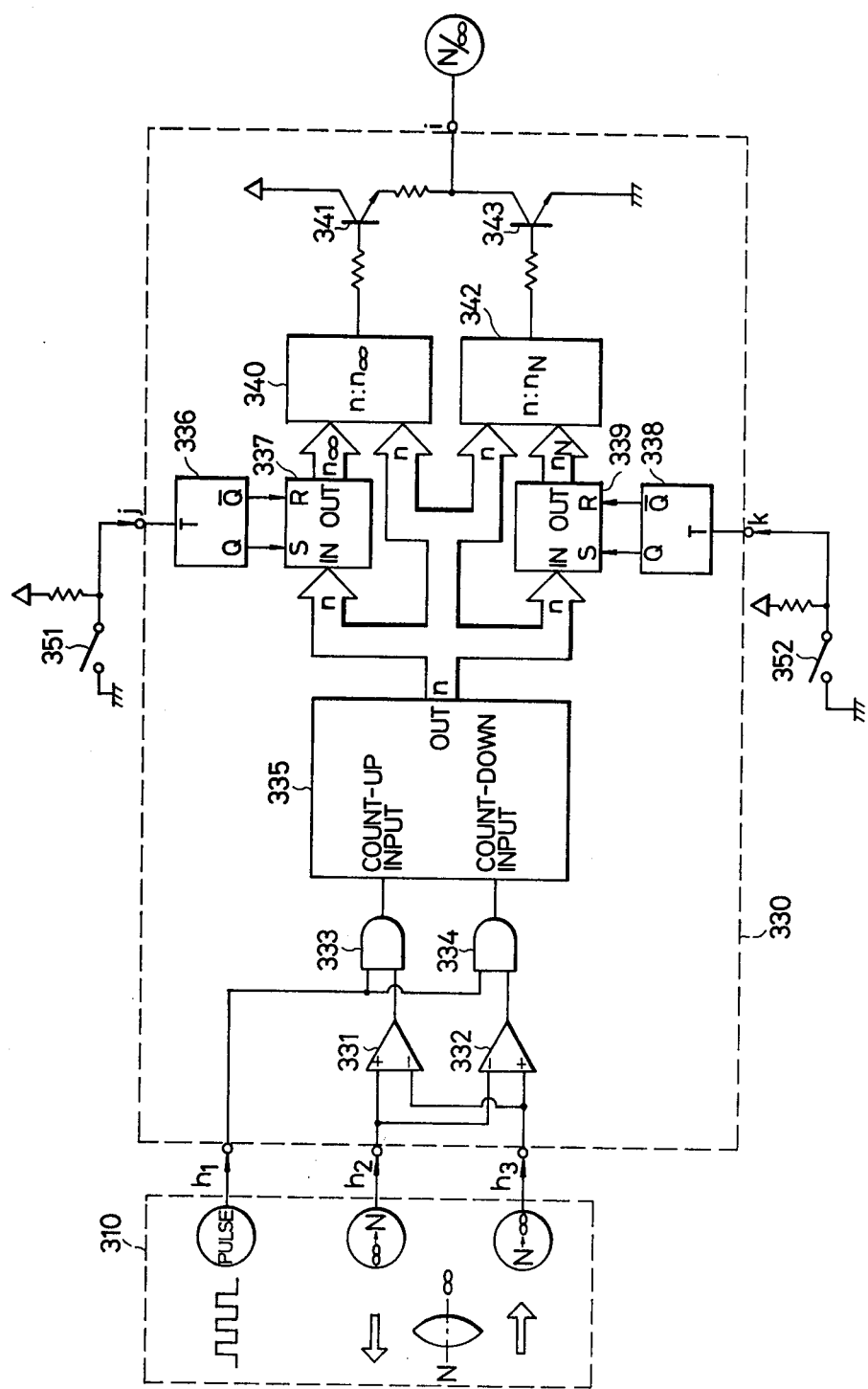
FIG. 11 is a circuit diagram showing an example of a setting circuit shown in FIG. 10.

FIG. 11 shows an example of the setting circuit 330.

The detecting device 330 in this example detects the relative movement of the objective lens and supplies signals representing the amount and direction of movement of the lens. The amount of movement is represented by a proportional number of pulses which are generated by an encoder composed of a chopper rotating integrally with the shaft 311 and positioned between a light-emitting element and a photosensor, and which are supplied to a terminal h1. The direction of movement is detected, from the direction of rotation of the shaft 311, by a generator, which supplies an L-level signal and an H-level signal respectively to terminals h2 and h3 when the lens is moved in a direction from a position focused to the infinity to a position focused to the nearest distance, and vice versa.

As mentioned above, in response to a movement in a direction from a position focused to the infinity to a position focused to the nearest position, the terminals h2 and h3 respectively receive L-level and H-level signals, whereby comparators 331, 332 respectively produces L-level and H-level signals. Simultaneously, the pulses of a number proportional to the amount of movement, supplied to the terminal h1, are entered to AND gates 333, 334. The AND gate 333, receiving the L-level signal from the comparator 331, produces an L-level signal, while the AND gate 334, receiving the H-level signal from the comparator 332, transmits the pulses from the terminal h1. Thus transmitted pulses are supplied to a count-down input terminal of an up-down counter 335 of which output number n therefore decreases stepwise in response to each pulse received through the terminal h1.

On the other hand, when the objective lens is driven in a direction from a position focused to the nearest distance to a position focused to the infinity, the terminals h2 and h3 respectively receive H-level and L-level signals, whereby the pulses of a number proportional to the amount of movement are supplied to a count-up input terminal of the up-down counter 335, of which output number n therefore increases stepwise in response to each pulse received through the terminal h1.

When the infinity setting switch 351 is closed after the objective lens 2 is moved to an end position of the desired moving range closer to the lens position focused to the infinity, an input terminal j is shifted from the H-level to the L-level, thereby causing a flip-flop 336 to produce an H-level output signal Q. This signal is supplied to a set terminal S of a latch 337, which thus latches the value $n_\infty$ of the aforementioned output n. Similarly, when the nearest setting switch 352 is closed after the lens is moved to the other end position of the desired moving range closer to the lens position focused to the nearest distance, an H-level signal is supplied to a set terminal S of a latch 339 from a flip-flop 338, whereby the latch 339 stores the value $n_N$ of the aforementioned output n in this state. The setting of the lens moving range is completed in this manner.

During the lens movement, a comparator 340 compares the output signal $n_\infty$ from the latch 337 with the output n from the up-down counter 335 and supplies an H-level signal when a condition $n = n_\infty$ is reached, whereby a transistor 341 is turned on to supply an H-level signal through an output terminal i to the processing circuit 7, thus advising that the objective lens 2 has reached the end position of the defined moving range closer to the infinity-focus lens position, and reversing the lens movement in case the in-focus state is not yet reached. A comparator 342 compares the output signal $n_N$ from the latch 339 with the output n from the up-down counter 335 and supplies an H-level signal when a condition $n = n_N$ is reached, whereby a transistor 343 is turned on to supply an L-level signal through the terminal i to the processing circuit 7, thus advising that the objective lens 2 has reached the end position of the defined moving range closer to the nearest-focus lens position, and reversing the lens movement in case the in-focus state is not yet reached.

In this manner the objective lens 2 is driven within the defined moving range, namely within an extent that the output n of the up-down counter 335 satisfies a condition $n_N \leq n \leq n_{2\delta}$.

The thus defined moving range can be cleared by closing the setting switches 351, 352 again, whereby the flip-flops 336, 338 supply H-level output signals $\bar{Q}$ to the reset terminals R of the latches 337, 339, thus resetting the latches.

Figure 12:
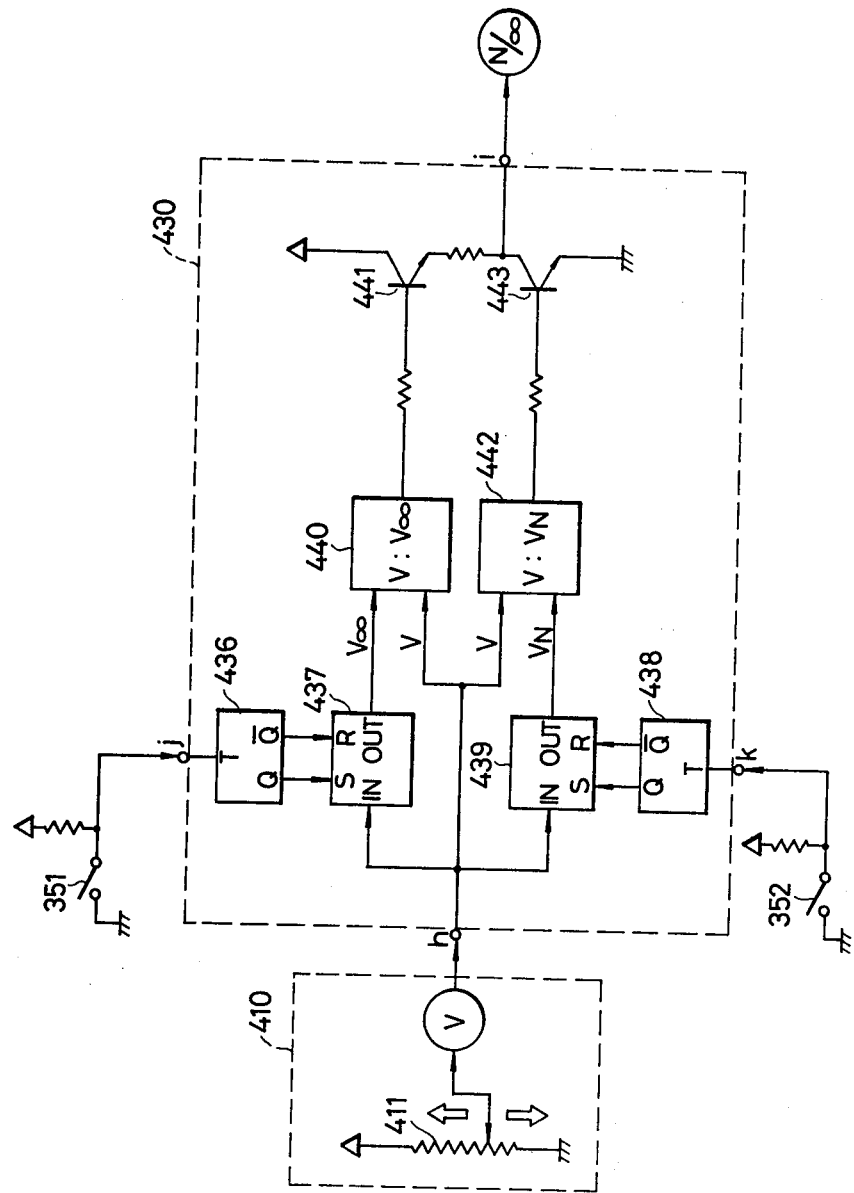
FIG. 12 is a circuit diagram showing another example of the setting circuit.

FIG. 12 shows an example of the setting circuit for detecting the absolute movement of the objective lens, wherein a detecting device 410 is provided with a sliding resistor 411 linked with the lens movement and supplies a voltage V, representing the absolute position of the lens, to a setting circuit 430 through a terminal h.

When the infinity setting switch 351 is closed after the objective lens 2 is moved to an end position of the desired moving range closer to the infinity-focus lens position, the potential of an input terminal j is shifted from the H-level to the L-level, whereby a flip-flop 436 releases an H-level output signal Q, in response to which a latch 437 latches the value $V_\infty$ of the aforementioned voltage V in this state. Similarly, when the nearest setting switch 352 is closed after the objective lens is moved to an end position of the desired moving range closer to the nearest-focus lens position, an H-level signal is supplied from a flip-flop 438 to a set terminal S of a latch 439, which thus latches the value $V_N$ of the aforementioned voltage V in this state. The setting of the lens moving range is completed in this manner.

During the lens movement, a comparator 440 compares the output $V_\infty$ from the latch 437 with the voltage V at the input terminal h and supplies an H-level signal when a condition $V = V_{2\delta}$ is reached, whereby a transistor 441 is turned on to supply an H-level signal through the terminal i to the processing circuit 7, thereby advising that the objective lens 2 has reached an end position of the moving range closer to the infinity-focus lens position, and reversing the lens movement if the in-focus state is not yet reached. A comparator 442 compares the output $V_N$ from the latch 439 with the voltage V at the terminal h and supplies an H-level signal when a condition $V = V_N$ is reached, whereby a transistor 443 is turned on to supply an L-level signal through the terminal i to the processing circuit 7, thereby advising that the objective lens 2 has reached an end position of the moving range closer to the nearest-focus lens position, and reversing the lens movement if the in-focus state is not yet reached.

In this manner the objective lens 2 moves within a defined moving range, namely within an extent that the voltage V at the input terminal h lies between $V_N$ and $V_\infty$.

The end position setting can be cleared substantially in the same manner as in the foregoing example shown in FIG. 11.

It is also easily possible to construct a detecting device generating code signals representing the absolute movement of the objective lens 2, and adapted for digital processing of the code signals.

Furthermore it is possible to eliminate the contacts 12, 13, 17 and the conductive member 11 if the reliability of the detecting device is sufficiently high.

In the foregoing embodiment, the operator can arbitrarily select both end positions of the lens moving range, but it is also possible to fix an end position of the range at the infinite focus position or at the nearest focus position and to leave the other end position as arbitrarily selectable.

We claim:

1. A device for moving an objective lens for focusing to an object, in which said objective lens is selectively permitted, by a switching operation, either to be moved within a normal moving range from a position focused to an object at a long distance to a position focused to an object at a short distance, or to be moved into a macro-photographing moving range from said latter position focused to an object at said short distance to a position focused to an object at an even shorter distance, comprising:
   (a) means for detecting the position, in reference to a predetermined focal plane, of an image of said object formed by said objective lens;
   (b) means for driving said objective lens in response to said detecting means; and
   (c) means for selectively setting a moving range in which said objective lens is movable by said driving means, wherein said setting means is capable of setting a limited moving range containing at least a part of said normal moving range and at least a part of said macro-photographing moving range.

2. A device according to Claim 1, wherein said setting means is adapted to set said limited moving range in response to said switching operation for selecting the lens movement into said macro-photographing moving range.

3. A photographing lens barrel provided with an objective lens and adapted to be coupled with a camera capable, in response to focus detecting means, of generating a control signal for guiding said objective lens to a position focused to an object, wherein said objective lens is selectively permitted, by a switching operation, either to be moved within a normal moving range from a position focused to an object at a long distance to a position focused to an object at a short distance, or to be moved into a macro-photographing moving range from said latter position focused to an object at said short distance to a position focused to an object at an even shorter distance, comprising:
   (a) means for detecting the position, in reference to a predetermined focal plane, of an image of said object formed by said objective lens;
   (b) means for driving said objective lens in response to said detecting means; and
   (c) means for selectively setting a moving range in which said objective lens is movable by said driving means, wherein said setting means is capable of setting a limited moving range containing at least a part of said normal moving range and at least a part of said macro-photographing moving range.

4. A photographing lens barrel according to Claim 3, wherein said setting means is adapted to set said limited moving range in response to said switching operation for selecting the lens movement into said macro-photographing moving range.

5. A device for moving an objective lens for focusing to an object, comprising:
   (a) means for detecting a state, in reference to a predetermined focal plane, of an image of said object formed by said objective lens;
   (b) means for driving said objective lens in response to said detecting means;
   (c) first signal means responsive to the movement of said objective lens for supplying respective signals when said objective lens has reached opposite ends of a predetermined first partial range within a total range in which said objective lens is movable;
   (d) second signal means responsive to the movement of said objective lens for supplying respective signals when said objective lens has reached opposite ends of a predetermined second partial range within the total range in which said objective lens is movable, one of the opposite ends of said second partial range being within said first partial range and the other end thereof being outside of said first partial range;
   (e) means for selectively enabling said first or second signal means, said enabling including switching operation means; and
   (f) means for disabling said driving means in response to the output from the enabled one of said first and second signal means.

6. A device according to claim 5, wherein said first signal means includes a pair of electric contacts provided in positions corresponding to the opposite ends of said first partial range and means for connection said electric contacts to said disabling means in response to the movement of said objective lens, and said second signal means includes a pair of electric contacts provided in positions corresponding to the opposite ends of said second partial range and means for connecting said electric contacts to said disabling means in response to the movement of said objective lens.

7. A device according to claim 5, wherein said first and second signal means supply outputs which are different from each other at the corresponding opposite ends of said first and second partial range, respectively.

8. A photographing lens barrel provided with an objective lens and adapted to be coupled with a camera capable, in response to focus detecting means, of generating a control signal for guiding said objective lens to a position focused to an object, comprising:
   (a) means for driving said objective lens in response to said control signal;
   (b) first signal means responsive to the movement of said objective lens for supplying respective signals when said objective lens has reached opposite ends of a predetermined first partial range within a total range in which said objective lens is movable;
   (c) second signal means responsive to the movement of said objective lens for supplying respective signals when said objective lens has reached opposite ends of a predetermined second partial range within the total range in which said objective lens is movable, one of the opposite ends of said second partial range being within said first partial range and the other end thereof being outside of said first partial range;

(d) means for selectively enabling said first or second signal means, said enabling means including operation means; and (e) means for disabling said driving means in response to the output from the enabled one of said first and second signal means.

9. A device for moving an objective lens for focusing to an object, comprising:
   (a) means for detecting the position, in reference to a predetermined focal plane, of an image of said object formed by said objective lens;
   (b) means for driving said objective lens in response to said detecting means;
   (c) signal means responsive to the movement of said objective lens for supplying an output when said objective lens has reached one end of a predetermined partial range within a total range in which said objective lens is movable;
   (d) means for discriminating the output supplied when said objective lens has reached said one end from inside of said partial range from the output supplied when said objective lens has reached said one end from outside of said parallel range; and
   (e) means for disabling said driving means in response to the output discriminated by said discriminating means.

10. A device for moving an objective lens for focusing to an object, comprising:
    (a) means for detecting the position, in reference to a predetermined focal plane, of an image of said object formed by said objective lens;
    (b) means for driving said objective lens in response to said detecting means;
    (c) signal means responsive to the movement of said objective lens for supplying respective signals when said objective lens has reached one end and the other end of a predetermined partial range within a total range in which said objectives lens is movable; and
    (d) means for controlling said driving means so that, during the movement of said objective lens in a first direction which is directed from said one end to said the other end, the movement of said objective lens in said first direction is stopped in response to said second signal, while continued in response to said first signal and that, during the movement of said objective lens in a second direction which is opposite to said first direction, the movement of said objective lens in said second direction is stopped in response to said first signal, while continued in response to said second signal.

11. A device for moving an objective lens for focusing to an object, comprising:
    (a) means for detecting the position, in reference to a predetermined focal plane, of an image of said object formed by said objective lens;
    (b) means for driving said objective lens in response to said detecting means;
    (c) counter means for supplying a count value which is renewed in response to the movement of said objective lens;
    (d) memory means;
    (e) operation means which, when operated at the time said objective lens is moved to such a position that, in response thereto, said counter means supplies one count value, registers said one count value in said memory means; and
    (f) comparing means for comparing the output from said counter means with contents of said memory means and supplying output for disabling said driving means when said count value to be renewed is equal to said one count value.

12. A device according to claim 11, wherein said memory means includes first and second memory means, said operation means includes first switching means adapted to be operated for registering said one count value in said first memory means and second switching means adapted to be operated for registering another count value in said second memory means, and said comparing means includes first and second comparing means for comparing the output from said counter means with the contents of said first and second memory means, respectively.

13. A device for moving an objective lens for focusing to an object, comprising:
    (a) means for detecting the position, in reference to a predetermined focal plane, of an image of said object formed by said objective lens;
    (b) means for driving said objective lens in response to said detecting means;
    (c) converting means for supplying a voltage value which varies in response to the movement of said objective lens;
    (d) memory means;
    (e) operation means which, when operated at the time said objective lens is moved to such a position that, in response thereto, said converting means supplies one voltage value, register said one voltage value in said memory means; and
    (f) comparing means for comparing the output from said converting means with contents of said memory means and supplying output for disabling said driving means when said varying voltage value is equal to said one voltage value.

14. A device according to claim 13, wherein said memory means includes first and second memory means, said operation means includes first switching means adapted to be operated for registering said one voltage value in said first memory means and second switching means adapted to be operated for registering another voltage value in said second memory means, and said comparing means includes first and second comparing means for comparing the output from said converting means with the contents of said first and second memory means one by one, respectively.

* * * * *

UNITED STATES PATENT AND TRADEMARK OFFICE
CERTIFICATE OF CORRECTION

PATENT NO. : 4,482,234

DATED : November 13, 1984

INVENTOR(S) : TADAO TAKAGI, ET AL.

It is certified that error appears in the above-identified patent and that said Letters Patent is hereby corrected as shown below:

Column 1, line 40, after "effect" insert --exact--.

Column 6, line 68, change "move" to --moves--.

Column 7, Table 2, line 16, "<  >" should be --< --- >--.

Column 10, line 49, "$V_{28}$" should be --$V_{\infty}$--.

IN THE CLAIMS:

Claim 6, line 4 (Column 12, line 36), change "connection" to --connecting--.

Claim 9, line 17 (Column 13, line 23) change "parallel to --partial--.

Signed and Sealed this

Ninth Day of April 1985

[SEAL]

Attest:

DONALD J. QUIGG

Attesting Officer     Acting Commissioner of Patents and Trademarks